US009006338B2

(12) United States Patent
Uchida et al.

(10) Patent No.: US 9,006,338 B2
(45) Date of Patent: Apr. 14, 2015

(54) AQUEOUS RESIN COMPOSITION HAVING GAS BARRIER PROPERTIES AND LAMINATED FILM USING THE SAME

(75) Inventors: Takashi Uchida, Osaka (JP); Tsutomu Tawa, Osaka (JP); Takuzo Imaizumi, Ama-gun (JP)

(73) Assignees: Mitsui Takeda Chemicals, Inc., Tokyo (JP); Futamura Kagaku Kabushiki Kaisha, Aichi (JP)

( * ) Notice: Subject to any disclaimer, the term of this patent is extended or adjusted under 35 U.S.C. 154(b) by 1713 days.

(21) Appl. No.: 10/575,783

(22) PCT Filed: Oct. 7, 2004

(86) PCT No.: PCT/JP2004/014825
§ 371 (c)(1),
(2), (4) Date: May 12, 2006

(87) PCT Pub. No.: WO2005/037923
PCT Pub. Date: Apr. 28, 2005

(65) Prior Publication Data
US 2007/0031679 A1    Feb. 8, 2007

(30) Foreign Application Priority Data

Oct. 15, 2003 (JP) ................................. 2003-354564

(51) Int. Cl.
| | |
|---|---|
| *C08G 18/12* | (2006.01) |
| *C08K 7/26* | (2006.01) |
| *C08K 9/04* | (2006.01) |
| *C08L 75/02* | (2006.01) |
| *C08L 75/04* | (2006.01) |
| *C08G 18/08* | (2006.01) |
| *C08K 5/205* | (2006.01) |
| *C09D 175/02* | (2006.01) |
| *C08K 3/34* | (2006.01) |
| *C08K 5/17* | (2006.01) |
| *C08G 18/32* | (2006.01) |
| *C08G 18/34* | (2006.01) |
| *C08G 18/38* | (2006.01) |
| *C08G 18/72* | (2006.01) |
| *C08G 18/75* | (2006.01) |
| *C08G 18/76* | (2006.01) |
| *C09D 175/04* | (2006.01) |

(52) U.S. Cl.
CPC ............ *C08G 18/0823* (2013.01); *C08K 5/205* (2013.01); *C09D 175/02* (2013.01); *C08L 75/04* (2013.01); *C08L 75/02* (2013.01); *C08K 3/346* (2013.01); *C08K 5/17* (2013.01); *C08G 18/324* (2013.01); *C08G 18/3271* (2013.01); *C08G 18/329* (2013.01); *C08G 18/348* (2013.01); *C08G 18/3893* (2013.01); *C08G 18/724* (2013.01); *C08G 18/757* (2013.01); *C08G 18/7642* (2013.01); *C09D 175/04* (2013.01); *C08K 2201/008* (2013.01)

(58) Field of Classification Search
CPC .......... C08K 3/346; C08K 5/205; C08K 5/17; C08K 2201/008; C08L 75/02; C08L 75/04; C09D 175/02; C09D 175/04
USPC ...................... 428/423.1, 425.1, 425.8, 425.9; 524/442, 591, 839, 840; 528/44, 85
See application file for complete search history.

(56) References Cited

U.S. PATENT DOCUMENTS

| | | | | |
|---|---|---|---|---|
| 5,981,029 A | * | 11/1999 | Harada et al. | 428/143 |
| 6,262,162 B1 | * | 7/2001 | Lan et al. | 524/445 |
| 6,395,209 B2 | * | 5/2002 | Yoshida et al. | 264/137 |
| 6,569,533 B1 | * | 5/2003 | Uchida et al. | 428/423.1 |
| 6,683,122 B1 | * | 1/2004 | Zilg et al. | 523/205 |
| 6,979,493 B2 | * | 12/2005 | Uchida et al. | 428/423.1 |

FOREIGN PATENT DOCUMENTS

| | | | | |
|---|---|---|---|---|
| EP | 1081170 A2 | * | 3/2001 | C08G 10/08 |
| JP | 62-148532 | | 7/1987 | |

(Continued)

OTHER PUBLICATIONS

Derwent Abstract of KR 2002/017569.*
Burton, Bruce, David Alexander, Howard Klein, Angela Garibay-Vasquez, Alan Pekarik, Chris Henkee. (Apr. 5, 2005) Epoxy Formulations Using Jeffamine Polyetheramines. Huntsman. pp. i-10 and 103 Online at:http://www.huntsman.com/performance_products/Media/EPOXY_FORMULATIONS_USING_JEFFAMINE%C2%AE_POLYETHERAMINES.pdf.*
English translation of Japanese Office Action issued Nov. 4, 2008 for JP2004-294955 corresponding to present U.S. application.

Primary Examiner — Ling Choi
Assistant Examiner — David L Miller
(74) Attorney, Agent, or Firm — Wenderoth, Lind & Ponack, L.L.P.

(57) ABSTRACT

An aqueous resin composition with gas barrier properties contains (i) polyurethane resin having aurethane group and a urea group in a total concentration of 25 to 60% by weight and having a acid value of 5 to 100 mgKOH/g, (ii) a swelling inorganic layered compound (e.g., a water-swelling mica, and a montmorillonite), and (iii) a polyamine compound having an amine value of 100 to 1900 mgKOH/g. The polyurethane resin (i) is obtained by a reaction of (A) an aromatic, araliphatic or alicyclic polyisocyanate, (B) a polyhydroxyalkanecarboxylic acid, and at least one component selected from (C) a $C_{2-8}$alkylene glycol and (D) a chain-extension agent (e.g., diamine, hydrazine and a hydrazine derivative), and neutralized with a neutralizing agent. The proportion of the acid group of the polyurethane resin (i) relative to the basic nitrogen atom of the polyamine compound (iii) is 10/1 to 1/5 as the equivalent ratio. A laminated film with high gas barrier properties is obtainable by coating a base film with the aqueous resin composition. The present invention provides an aqueous resin composition with excellent gas barrier properties, and a laminated film using the same.

16 Claims, No Drawings

(56) References Cited

FOREIGN PATENT DOCUMENTS

| | | |
|---|---|---|
| JP | 06-057066 | 3/1994 |
| JP | 06-093133 | 4/1994 |
| JP | 08-053572 | 2/1996 |
| JP | 10-166516 | 6/1998 |
| JP | 2001-048994 | 2/2001 |
| JP | 2001-098047 | 4/2001 |
| JP | 2003-211578 | 7/2003 |
| JP | 2005-138581 | 6/2005 |
| JP | 2005-139435 | 6/2005 |
| WO | WO 0104193 A1 * | 1/2001 ............... C08K 9/04 |
| WO | WO 03059817 A2 * | 7/2003 ............. C01B 33/44 |
| WO | 2005/037923 | 4/2005 |

* cited by examiner

AQUEOUS RESIN COMPOSITION HAVING GAS BARRIER PROPERTIES AND LAMINATED FILM USING THE SAME

TECHNICAL FIELD

The present invention relates to an aqueous resin composition having excellent gas barrier properties and excellent adhesiveness to a base or substrate such as a plastic, and to a laminated film in which the composition is coated or layered (or laminated) on the base.

BACKGROUND ART

As films having high gas barrier properties for food packaging or the like, a film has been known in which a base film is coated with a vinylidene chloride copolymer (hereinafter, simply referred to as PVDC). However, the burnt PVDC generates a toxic or hazardous gas, and in addition, produces an organic chlorine-containing compound with high carcinogenicity upon incineration at low temperatures. For such reasons, switching over from PVDC to other materials has been strongly desired.

Moreover, as films having high oxygen-gas barrier properties, a film coated with a polyvinyl alcohol (hereinafter, simply referred to as PVA) or an ethylene-vinyl alcohol copolymer (hereinafter, simply referred to as EVOH) has been also known. Due to high hydrophilicity of PVA and EVOH, however, such a film tends to deteriorate gas barrier properties (particularly barrier properties against water) remarkably under a highly humid environment.

Japanese Patent Application Laid-Open No. 93133/1994 (JP-6-93133A, Patent Document 1) discloses a resin composition containing a resin and an inorganic layered compound (expansive clay mineral) having a particle size of not more than 5 µm and an aspect ratio of 50 to 5000, or a film using the composition. This document mentions that examples of the resin include a polyvinyl alcohol, an ethylene-vinyl alcohol copolymer, a polyvinylidene chloride, a polyacrylonitrile, a polysaccharide, a polyacrylic acid and an ester thereof, and that the resin is preferably a resin highly forming a hydrogen bond.

Japanese Patent Application Laid-Open No. 57066/1994 (JP-6-57066A, Patent Document 2) discloses an aqueous composition consisting of an aqueous dispersion of an ethylene-vinyl alcohol-series copolymer which may have an ionic group, and an inorganic filler, wherein the ethylene content of the ethylene-vinyl alcohol-series copolymer is 15 to 65% by mol. This document describes that a water-swelling philosilicate (such as a montmorillonite) is preferred as the inorganic filler.

Japanese Patent Application Laid-Open No. 48994/2001 (JP-2001-48994A, Patent Document 3) discloses a gas barrier film which comprises a thermoplastic resin base (e.g., a polypropylene film), and a coating layer containing an inorganic plate-like particle and a water-soluble polymer (e.g., a polyvinyl alcohol-series polymer) as constituent components, the coating layer being formed on at least one side of the base, wherein the film is defined by the relationship between the thickness of the coating layer and the number of projections having a given height on the surface of the coating layer.

However, since the water-soluble or water-dispersive polymer (particularly a water-soluble polymer which highly forms a hydrogen bond) is used in these compositions, coating agents employing these compositions are high in viscosity, as a result, it is difficult to apply (or coat) these compositions in a high concentration. Further, due to easiness of water retention, the coating layer is low in drying characteristic and remains insufficient in gas barrier properties under a highly humid condition.

Japanese Patent Application Laid-Open No. 98047/2001 (JP-2001-98047A, Patent Document 4) discloses a gas barrier polyurethane resin which is obtained by a reaction between a diisocyanate component and a $C_{2-8}$ alkylene glycol, wherein the total concentration of the urethane group and the urea group is not less than 15% by weight. This document mentions that an aqueous dispersion is obtained by allowing a dihydroxycarboxylic acid such as dimethylolpropionic acid to react with an alkylene glycol to produce a prepolymer, neutralizing the prepolymer with an amine, and elongating the prepolymer chain with the use of a chain-extension agent such as a diamine or a hydrazine. Further, the document also describes that the polyurethane-series resin may contain an expansive inorganic layered compound or a silane coupling agent. Use of the urethane-series resin ensures to improve gas barrier properties. However, higher gas barrier properties are desired for the aqueous (or water-soluble) urethane-series resin.

[Patent Document 1] JP-6-93133A (Claims)
[Patent Document 2] JP-6-57066A (Claims)
[Patent Document 3] JP-2001-48994A (Claims)
[Patent Document 4] JP-2001-98047A (Claims, Paragraph Numbers [0035] to [0039], and [0076] to [0079])

DISCLOSURE OF THE INVENTION

Problems to be Solved by the Invention

It is therefore an object of the present invention to provide an aqueous resin composition which is excellent in gas barrier properties against oxygen, water vapor, and others, and a laminated film (or laminate) using the resin composition.

Another object of the present invention is to provide an aqueous resin composition which exhibits high gas barrier properties even under highly humid conditions, and a laminated film using the composition.

Still another object of the present invention is to provide an aqueous resin composition having no possibility of the environmental pollution and having excellent gas barrier properties, and a laminated film (or laminate) using the composition.

Means to Solve the Problems

The inventors of the present invention made intensive studies to achieve the above objects and finally found that an aqueous resin composition obtained by a combination of a polyurethane resin having a urethane group and a urea group in a specific concentration and having an acid group, a swelling inorganic layered compound, and a polyamine compound realizes a film having excellent gas barrier properties and no possibility of the environmental pollution. The present invention was accomplished based on the above findings.

That is, the aqueous (or water-based or water-soluble) resin composition having gas barrier properties (or aqueous urethane-series resin composition) of the present invention comprises (i) a polyurethane resin having a urethane group and a urea group in a total concentration of 25 to 60% by weight and having an acid group, (ii) a swelling (or swellable) inorganic layered (or stratified) compound, and (iii) a polyamine compound. The polyurethane resin (i) may be a resin obtained by at least a reaction of (A) a polyisocyanate compound containing at least one member selected from the group consisting of an aromatic polyisocyanate, an araliphatic polyisocyanate and an alicyclic polyisocyanate, and (B) a polyhydroxyalkanoic acid, and usually neutralized with a neutralizing agent. The polyurethane resin (i) may be a copolymer obtained by a reaction of these components and other component(s). For example, the polyurethane resin (i) may be also obtained by a reaction of (A) a polyisocyanate compound which contains at least one member selected from the group consisting of an aromatic polyisocyanate, an araliphatic polyisocyanate and an alicyclic polyisocyanate in a proportion of not less than 30% by weight in the polyisocyanate compound, (B) a polyhydroxycarboxylic acid, and at least one component selected from the group consisting of (C) a polyol component and (D) a chain-extension agent component. The polyisocyanate compound (A) may contain at least one member selected from the group consisting of a xylylene diisocyanate and a hydrogenated xylylene diisocyanate. Moreover, the polyol component (C) may be a polyol compound having 2 to 8 carbon atoms in a proportion of not less than 90% by weight. The chain-extension agent component (D) may be, for example, at least one member selected from the group consisting of a diamine, hydrazine andahydrazinederivative. The swelling inorganic layered compound (ii) may comprise, for example, at least one member selected from the group consisting of a water-swelling mica and a montmorillonite. Further, the acid value of the polyurethane resin (i) may be about 5 to 100 mgKOH/g. The amine value of the polyamine compound (iii) may be about 100 to 1900 mgKOH/g. Moreover, the proportion of the acid group of the polyurethane resin (i) relative to the basic nitrogen atom of the polyamine compound (iii) [(i)/(iii)] may be about 10/1 to 1/5 as the equivalent ratio. Furthermore, the ratio of the swelling inorganic compound (ii) relative to the polyurethane resin (i) [(ii)/(i)] may be about 1/100 to 200/100 in terms of solid content. The polyurethane resin (ii) may be a water dispersion in which the resin is dispersed in water, or an aqueous solution in which the resin is dissolved in water.

The present invention also includes a laminated film (or laminate) comprising abase film, and a layer formed on at least one surface of the base film, wherein the layer comprises the aqueous resin composition.

Effects of the Invention

According to the present invention, the combination use of a polyurethane resin having a urethane group and a urea group in a high concentration and having an acid group, a swelling inorganic layered compound, and a polyamine compound realizes excellent gas barrier properties (gas barrier properties against oxygen, water vapor, an aroma (or fragrant) component, and others). Moreover, by the combination mentioned above, excellent gas barrier properties can be ensured even under conditions of high humidity, in addition to solvent resistance and water resistance. Further, such an aqueous (or water-based or water-soluble) composition has no possibility of the environmental pollution.

DETAILED DESCRIPTION OF THE INVENTION

[Polyurethane Resin (i)]

The base resin (i) in the aqueous resin composition of the present invention constitutes an anionic self-emulsified polyurethane resin (or aqueous polyurethane resin). In the base resin, the total concentration of a urethane group and a urea group is high, and the base resin has an acid group.

The total concentration of the urethane group and the urea group in the polyurethane resin is about 25 to 60% by weight (e.g., about 30 to 55% by weight), and preferably about 35 to 55% by weight (particularly about 35 to 50% by weight).

Incidentally, the concentration of the urethane group and the concentration of the urea group mean values obtained by dividing the molecular weight of the urethane group (59 g/equivalent) or the molecular weight of the urea group (primary amino group (amino group): 58 g/equivalent, secondary amino group (imino group): 57 g/equivalent) by a molecular weight of a repeated constitutional unit structure. Incidentally, in the case of using a mixture, each concentration of the urethane group and the urea group can be calculated based on supplied amounts of reaction components, that is, a proportion of each component to be used.

The acid group of the polyurethane resin may include a carboxyl group, a sulfonic acid group, and others. The acid group may be located in an end or a side chain of the polyurethane resin (in particular, at least a side chain). The acid group can be usually neutralized with a neutralizing agent (a base), and the acid group and the base may form a salt.

The acid value of the polyurethane resin may be selected from a range in which water solubility or water dispersibility can be imparted to the resin, and is usually about 5 to 100 mgKOH/g, preferably about 10 to 70 mgKOH/g (e.g., about 10 to 60 mgKOH/g), and more preferably about 15 to 60 mgKOH/g (e.g., about 16 to 50 mgKOH/g).

The number average molecular weight of the polyurethane resin may be selected from the range of about 800 to 1,000,000, preferably about 800 to 200,000, and more preferably about 800 to 100,000.

The polyurethane resin is excellent in gas barrier properties, and the oxygen permeability [unit: ml/(m$^2$·atm·day) under a temperature of 20° C. and a humidity of 80% RH] of the polyurethane resin is, at a thickness of 1 μm, for example, not more than 500, preferably not more than 400 (e.g., about 100 to 400), and more preferably not more than 300 (e.g., about 50 to 300).

Such a polyurethane resin (i) may be obtained by at least a reaction of (A) a polyisocyanate compound (particularly a diisocyanate compound) and (B) a polyhydroxy acid (e.g., a polyhydroxyalkanoic acid, particularly a dihydroxy acid). The polyurethane resin (i) may be also obtained by a reaction of the components (A), (B), and in addition at least one component selected from the group consisting of (C) a polyol component (particularly a diol component such as an alkylene glycol) and (D) a chain-extension agent (particularly a bifunctional chain-extension agent).

(A) Polyisocyanate Compound

The polyisocyanate compound may include an aromatic polyisocyanate, an araliphatic polyisocyanate, an alicyclic polyisocyanate, an aliphatic polyisocyanate, and others. As the polyisocyanate compound, a diisocyanate compound is usually employed.

The aromatic diisocyanate may include, for example, tolylene diisocyanate (TDI), phenylene diisocyanate, 4,4'-diphenyl diisocyanate, 1,5-naphthalene diisocyanate (NDI), diphenylmethane diisocyanate (MDI), 4,4'-toluidine diisocyanate (TODI), and 4,4'-diphenyl ether diisocyanate.

As the araliphatic diisocyanate, there may be mentioned xylylene diisocyanate (XDI), tetramethylxylylene diisocyanate (TMXDI), ω,ω'-diisocyanate-1,4-diethylbenzene, and others.

Examples of the alicyclicdiisocyanate may include 1,3-cyclopentene diisocyanate, cyclohexane diisocyanate, 3-isocyanatomethyl-3,5,5-trimethylcyclohexyl isocyanate (isophorone diisocyanate, IPDI), methylenebis (cyclohexyl isocyanate) [hydrogenated MDI (H$_{12}$MDI), dicyclohexylmethane diisocyanate], methylcyclohexane diisocyanate, and bis(isocyanatomethyl)cyclohexane (hydrogenated XDI).

The aliphatic diisocyanate may include, for example, trimethylene diisocyanate, 1,2-propylene diisocyanate, butylene diisocyanate, hexamethylene diisocyanate, pentamethylene diisocyanate, trimethylhexamethylene diisocyanate, and 2,6-diisocyanatomethyl caproate.

As the polyisocyanate compound (particularly a diisocyanate compound) (A), a polyisocyanate compound containing a hydrocarbon ring-containing compound is preferably used. Such a compound may include, for example, an aromatic polyisocyanate, an araliphatic polyisocyanate and an alicyclic polyisocyanate (particularly a diisocyanate). More specifically, from the viewpoint of gas barrier properties, an aromatic diisocyanate (e.g., TDI, MDI, and NDI), an araliphatic diisocyanate (e.g., XDI, and TMXDI) and an alicyclic diisocyanate (e.g., IPDI, hydrogenated XDI, and hydrogenated MDI) are preferred, and, MDI, XDI, hydrogenated XDI, hydrogenated MDI, and others are particularly preferred. These polyisocyanate compounds may be used singly or in combination.

The content of at least one polyisocyanate compound selected from the aromatic, araliphatic and alicyclic polyisocyanates is not less than 30% by weight (e.g., 30 to 100% by weight, preferably 50 to 100% by weight, and more preferably 70 to 100% by weight) relative to the whole polyisocyanate compound (A).

The polyisocyanate compound preferably contains at least one member selected from the group consisting of xylylene diisocyanate and hydrogenated xylylene diisocyanate. The proportion of the xylylene diisocyanate and/or hydrogenated xylylene diisocyanate relative to the whole polyisocyanate compound (A) is usually not less than 20% by weight (20 to 100% by weight), preferably 25 to 100% by weight, and more preferably 30 to 100% by weight.

These diisocyanate components may be used singly or in combination. Further, if necessary, the diisocyanate component may be used together with a polyisocyanate having three or more functionalities.

(B) Polyhydroxy Acid

As the polyhydroxy acid, there may be used a carboxylic acid or a sulfonic acid, particularly, at least one organic acid selected from the group consisting of a polyhydroxycarboxylic acid and a polyhydroxysulfonic acid.

Examples of the polyhydroxycarboxylic acid (particularly a dihydroxycarboxylic acid) may include a dihydroxy$C_{2-10}$alkane-carboxylic acid such as dimethylolpropionic acid, dimethylolbutanoic acid, or 2,2-dimethylolhexanoic acid; a dihydroxy$C_{4-10}$alkane-polycarboxylic acid or dihydroxy$C_{4-10}$alkene-polycarboxylic acid such as dioxymaleic acid; a dihydroxy$C_{6-10}$arene-carboxylic acid such as 2,6-dihydroxybenzoic acid; and others. These polyhydroxy acids may be used singly or in combination. The preferred polyhydroxy acid includes a polyhydroxyalkanecarboxylic acid, particularly a dihydroxyalkanoic acid, for example, a dihydroxy $C_{2-8}$alkane-carboxylic acid.

Incidentally, the polyhydroxy acid may be used in the form of a salt. The salt of the polyhydroxy acid may include, for example, an ammonium salt, an amine salt (e.g., a trialkylamine salt), and a metal salt (e.g., a sodium salt).

The polyurethane resin (i) may be obtained by a reaction of at least the components (A) and (B). In many cases, the reaction is conducted by using the components (A) and (B) in combination with at least one member selected from the group consisting of the polyol component (C) and/or the chain-extension agent component (D). Incidentally, the acid value of the polyurethane resin (i) may be adjusted by the amount of the polyhydroxy acid (B).

(C) Polyol Component

As the polyol component (particularly a diol component), from the viewpoint of gas barrier properties, a low molecular weight glycol, for example, an alkylene glycol (e.g., a straight or branched chain $C_{2-10}$alkylene glycol such as ethylene glycol, propylene glycol, trimethylene glycol, 1,3-butanediol, 1,4-butanediol, pentanediol, hexanediol, neopentyl glycol, heptanediol, or octanediol), a (poly)oxy$C_{2-4}$alkylene glycol (e.g., diethylene glycol, triethylene glycol, tetraethylene glycol, and dipropylene glycol), and others are usually employed. The preferred glycol component includes a $C_{2-8}$polyol component [for example, a $C_{2-6}$alkylene glycol (particularly, ethylene glycol, 1,2- or 1,3-propylene glycol, 1,4-butanediol, 1,6-hexanediol, 3-methyl-1,5-pentanediol)], and a di- or trioxy$C_{2-3}$alkylene glycol (e.g., diethylene glycol, triethylene glycol, and dipropylene glycol). The particularly preferred diol component includes a $C_{2-8}$alkylene glycol (particularly a $C_{2-6}$alkylene glycol).

These diol components may be used singly or in combination. Further, if necessary, an aromatic diol, an alicyclic diol or other low molecular weight diol component may be used in combination. Furthermore, if necessary, such a diol component may be used together with a polyol component having three or more functionalities.

The polyol component preferably contains at least a $C_{2-8}$polyolcomponent (particularly, a $C_{2-6}$alkyleneglycol) and/or a di- or trioxy$C_{2-3}$alkylene glycol component. The ratio of the total amount of the $C_{2-8}$polyol component (particularly, the $C_{2-6}$alkylene glycol) and the di- or trioxy $C_{2-3}$alkylene glycol relative to the whole polyol component is usually not less than 90% by weight (90 to 100% by weight).

(D) Chain-Extension Agent

As the chain-extension agent, there may be used a nitrogen-containing compound having an active hydrogen atom, particularly at least one member selected from the group consisting of a diamine, hydrazine and a hydrazine derivative.

The diamine component as the chain-extension agent may include, for example, an aliphatic amine (e.g., a $C_{2-10}$alkylenediamine such as ethylenediamine, trimethylenediamine, tetramethylenediamine, pentamethylenediamine, hexamethylenediamine, 2,2,4-trimethylhexamethylenediamine, 2,4,4-trimethylhexamethylenediamine, or octamethylenediamine), an aromatic amine (e.g., m- or p-phenylenediamine, 1,3- or 1,4-xylylenediamine, or a mixture thereof), an alicyclic amine [e.g., hydrogenated xylylenediamine, bis(4-aminocyclohexyl)methane, isophoronediamine, and bis(4-amino-3-methylcyclohexyl)methane], and a hydroxyl group-containing diamine [e.g., an amino$C_{2-6}$alkylamino$C_{2-3}$alkyl alcohol such as 2-[(2'-aminoethyl)amino]ethanol, 2-aminoethylaminopropanol, 2-(3'-aminopropyl)aminoethanol(3-(2'-hydroxyethyl)aminopropylamine)].

The hydrazine and the hydrazine derivative may include hydrazine, a hydroxyl group-containing hydrazine (e.g., a hydrazino$C_{2-3}$alkyl alcohol such as 2-hydrazinoethanol), and a dicarboxylic acid hydrazide [for example, an aliphatic dicarboxylic acid hydrazide (e.g., a $C_{4-20}$alkane-dicarboxylic acid dihydrazide such as succinic acid dihydrazide, adipic acid dihydrazide, glutaric acid dihydrazide, or dodecanedioic acid dihydrazide), anaromaticdicarboxylicacidhydrazide (e.g., a $C_{6-10}$arene-dicarboxylic acid hydrazide such as isophthalic acid dihydrazide)], and others. These chain-extension agent components may be used singly or in combination.

Among these chain-extension agents, from the viewpoint of gas barrier properties, a low molecular weight chain-extension agent having not more than 8 carbon atoms (2 to 8 carbon atoms, particularly 2 to 6 carbon atoms) is usually employed, for example, a diamine (e.g., a $C_{2-6}$alkylenediamine such as ethylenediamine, tetramethylenediamine, pentamethylenediamine, or hexamethylenediamine, 2-aminoethylaminoethanol, and xylylenediamine), hydrazine, and a hydrazine derivative (e.g., 2-hydrazinoethanol, and adipic acid dihydrazide). Incidentally, if necessary, the chain-extension agent may be used together with a polyamine component having three or more functionalities (e.g., a polyamine, and a polyhydrazide).

Incidentally, if necessary, in a preparation of the polyurethane resin, a reactive compound (e.g., a polyesterdiol, and a polyetherdiol) may be allowed to react with the isocyanate group.

The acid group of the polyurethane resin (i) is neutralized with a neutralizing agent or a base. The neutralizing agent may include a conventional base, for example, an organic base [for example, a tertiary amine (e.g., a triC$_{1-4}$alkylamine such as trimethylamine or triethylamine, an alkanolamine such as dimethylethanolamine, methyldiethanolamine, triethanolamine or trisopropanolamine, and a heterocyclic amine such as morpholine)], and an inorganic base [for example, ammonia, an alkali metal hydroxide (e.g., lithium hydroxide, sodium hydroxide, and potassium hydroxide), and an alkali metal carbonate (e.g., sodium carbonate, and potassium carbonate)]. These bases may be used singly or in combination. From the viewpoint of gas barrier properties, a volatile base, for example, a triC$_{1-3}$alkylamine such as triethylamine, an alkanolamine such as dimethylethanolamine, and ammonia are preferred.

Incidentally, the degree of neutralization with the neutralizing agent may be, for example, about 30 to 100%, preferably about 50 to 100%, and particularly about 75 to 100%.

The aqueous polyurethane resin composition usually comprises the polyurethane resin, the neutralizing agent, and an aqueous medium. Examples of the aqueous medium may include water, a water-soluble or hydrophilic solvent (for example, an alcohol such as ethanol or isopropanol; a ketone such as acetone or methyl ethyl ketone; an ether such as tetrahydrofuran; a cellosolve; a carbitol; and a nitrile such as acetonitrile), or a mixed solvent thereof. The aqueous medium is usually water, or an aqueous solvent containing water as a main component. The polyurethane resin may be in the form of either an aqueous solution in which the resin is dissolved in the aqueous medium or a water dispersion in which the resin is dispersed in the aqueous medium.

The process for producing the polyurethane resin is not particularly limited to a specific one. The polyurethane resin may be prepared with the use of a common technique for making a polyurethane resin aqueous, such as an acetone method or a prepolymer method. Moreover, in the urethanizing reaction, if necessary, preparation process for polyurethane catalyst such as amines, tin compounds, or lead compounds can be used. More specifically, the aqueous polyurethane resin may be prepared as follows: the polyisocyanate compound (A) and the polyhydroxy acid (B), and if necessary the polyol component (C), are allowed to react in an inert organic solvent (particularly, a hydrophilic or water-soluble organic solvent) to produce a prepolymer having a terminal isocyanate group, the prepolymer is neutralized with a neutralizing agent, and dissolved or dispersed in an aqueous medium, then, if necessary, the chain-extension agent component (D) is added to the resulting solution or dispersion for reacting the chain-extension agent component with the prepolymer, and the organic solvent is removed from the resultant mixture to give an aqueous polyurethane resin.

Incidentally, the proportion of the total amount of components having an active hydrogen atom [the polyhydroxy acid (B), the polyol component (C) and the chain-extension agent component (D)] is, relative to 1 mol of the isocyanate group of the polyisocyanate compound (A), about 0.5 to 1.5 mol, preferably about 0.7 to 1.3 mol, and more preferably about 0.8 to 1.2 mol as the total amount of the active hydrogen atom (or an organic group having an active hydrogen atom) in each component (B), (C) and (D).

[Expansive (or Expansile) Inorganic Layered Compound (ii)]

The swelling inorganic layered (or stratified) compound comprises ultrathin unit crystals, and is a clay mineral having swellability due to coordinating or absorbing a solvent between the unit crystal layers. The swelling inorganic layered compound may include a hydrated silicate (e.g., philosilicate mineral), for example, a kaolinite group clay mineral (e.g., a halloysite, a kaolinite, an endellite, a dickite, and a nakhlite), an antigorite group clay mineral (e.g., an antigorite, and a chrysotile), a smectite group clay mineral (e.g., a montmorillonite, a beidellite, a nontronite, a saponite, a hectorite, a sauconite, and a stevensite), a vermiculite group clay mineral (e.g., a vermiculite), a mica group clay mineral (e.g., amica such as a muscovite or a phlogopite, amargarite, a tetrasilylic mica, and a taeniolite), and others. These clay minerals may be a natural clay mineral or a synthetic clay mineral. The swelling inorganic layered compound may be used singly or in combination. Among these inorganic layered compounds, the smectite group clay mineral (e.g., a montmorillonite), and the mica group clay mineral (e.g., a water-swelling mica) are preferably preferred.

The mean particle size of the swelling inorganic layered compound may be usually not more than 10 μm (e.g., about 50 nm to 5 μm), and preferably about 100 nm to 3 μm. The aspect ratio of the swelling inorganic layered compound may be, for example, about 50 to 5000, preferably about 100 to 3000, and more preferably about 200 to 2000.

The weight proportion (solid content) of the swelling inorganic compound (ii) relative to the polyurethane resin (i) [the former/the latter] is about 1/100 to 200/100, preferably about 3/100 to 100/100, and more preferably about 5/100 to 50/100.

[Polyamine Compound (iii)]

In the present invention, the combination use of the urethane resin, the swelling inorganic layered compound and the polyamine compound exhibits high gas barrier properties. Although the expression mechanism of gas barrier properties in the composition of the present invention is not clear, it is presumed that the passage of gas is regulated by binding a cation existing between layers constituting the swelling inorganic layered compound to the acid group of the urethane resin, and interposing (or inserting) a polyamine compound between the layers to enlarge space between the layers constituting the inorganic layered compound. Therefore, in a composition containing neither the inorganic layered compound nor the polyamine compound, significant improvement in gas barrier properties cannot be expected.

As the polyamine compound, there may be used various polyamines having a plurality of basic nitrogen atoms selected from the group consisting of a primary amino group, a secondary amino group and a tertiary amino group.

As the polyamine compound, various compounds may be used as far as gas barrier properties are improved. Such a polyamine may usually have an amine value of about 100 to 1900 mgKOH/g, preferably about 150 to 1900 mgKOH/g (e.g., about 200 to 1700 mgKOH/g), and more preferably about 200 to 1900 mgKOH/g (e.g., about 300 to 1500 mgKOH/g). The amine value of the polyamine compound may be about 300 to 1900 mgKOH/g.

Examples of the polyamine compound may include an aliphatic polyamine such as an alkylenediamine (e.g., a $C_{2-10}$alkylenediamine such as ethylenediamine, 1,2-propylenediamine, 1,3-propylenediamine, 1,4-butanediamine, 1,6-hexamethylenediamine, 2,5-dimethylhexamethylenediamine, or trimethylhexamethylenediamine), a hydroxyl group-containing diamine (e.g., the amino$C_{2-6}$alkylamino $C_{2-3}$alkylalcohols exemplified in the paragraph of the chain-extension agent), a polyalkylenepolyamine (e.g., a di- to tetraalkylenepolyamine such as diethylenetriamine, or triethylenetetramine), an N-alkyl substituted alkylenediamine (e.g., N,N,N',N'-tetramethylethylenediamine, N,N,N',N'-tetramethyl-1,3-propylenediamine, N,N,N',N'-tetramethyl-1,6-hexanediamine, N,N-dimethyl-1,2-ethylenediamine, and N,N-dimethyl-1,3-propanediamine), or an N-alkyl substituted polyalkylenepolyamine; an alicyclic polyamine such as isophoronediamine, menthenediamine, or a hydrogenated product of metaxylylenediamine; an aromatic polyamine such as diaminobenzene, or xylylenediamine; an adduct of such a polyamine compound with an alkylene oxide (a $C_{2-4}$alkylene oxide such as ethylene oxide (EO) or propylene oxide (PO)) (for example, an adduct with about 1 to 6 mol of an alkylene oxide, e.g., an adduct of ethylenediamine with 4 mol of EO, and an adduct of xylylenediamine with 4 mol of EO).

Moreover, a silicon compound having a plurality of basic nitrogen atoms (e.g., a silane coupling agent) may be also used, for example, a [(2-amino$C_{2-4}$alkyl)amino$C_{1-4}$alkyl] tri$C_{1-2}$alkoxysilane such as 2-[N-(2-aminoethyl) amino]ethyltrimethoxysilane or 3-[N-(2-aminoethyl)amino]propyltriethoxysilane, an [(amino$C_{2-4}$alkyl)amino$C_{2-4}$alkyl] $C_{1-4}$alkyldi$C_{1-2}$alkoxysilane corresponding to each of these trialkoxysilanes, and others.

Further, as the polyamine compound, a modified polyamine compound, for example, a urethane-modified polyamine compound may be used. The urethane-modified polyamine compound may be prepared by an addition reaction of a polyisocyanate compound (e.g., a diisocyanate or a modified product thereof, such as hexamethylene diisocyanate orhydrogenatedXDI) and an alcoholic polyamine (e.g., a hydroxyl group-containing tertiary amine such as dimethylethanolamine or dimethylpropanolamine (particularlyadialkyl$C_{2-4}$alkanolamine)). Incidentally, in the preparation of the urethane-modified polyamine compound, not only the above-exemplified polyisocyanate compound (A) but also a modified product of the polyisocyanate compound (A) (e.g., a dimer, a trimer, a modified allophanate, and a modified biuret) may be used.

Further, an oligomer or polymer compound such as a polyethyleneimine, a polyallylamine, or a polyvinylamine may be also used.

These polyamine compounds may be used singly or in combination. Among these polyamine compounds, a short-chain aliphatic polyamine (e.g., a diamine such as $C_{2-8}$alkylenediamine or a di- or tri$C_{2-3}$alkylenepolyamine, an alkylenediamine having methyl group as a substituent on a nitrogen atom thereof, or a di- or tri$C_{2-3}$alkylenepolyamine having methyl group as a substituent on a nitrogen atom thereof), a monocyclic polyamine (e.g., a diamine such as diaminobenzene or xylylenediamine), an adduct of such a polyamine compound with 1 to 4 mol of a $C_{2-3}$alkylene oxide, a silicon compound having a plurality of basic nitrogen atoms (e.g., a silane coupling agent), a urethane-modified polyamine compound, and others are preferred. Further, among these polyamine compounds, a water-soluble or water-dispersive polyamine compound is preferred.

The proportion of the polyurethane resin (i) relative to the polyamine compound (iii) is not particularly limited to a specific one as far as gas barrier properties are improved, and may be, for example, about 10/1 to 1/5, preferably about 5/1 to 1/3, and more preferably about 3/1 to 1/2 (e.g., about 2/1 to 1/2) as the equivalent ratio of the acid group relative to the basic nitrogen atom.

If necessary, the aqueous resin composition may contain various additives in a range not deteriorating gas barrier properties. Examples of the additive may include a silane coupling agent, a stabilizer (e.g., an antioxidant, a heat stabilizer, and an ultraviolet ray absorber), a plasticizer, an antistatic agent, a lubricant, a blocking inhibitor, a coloring agent, a filler, and a nucleation agent.

Incidentally, the process for preparing the aqueous resin composition (or coating agent having gas barrier properties) is not particularly limited to a specific one. For example, the aqueous resin composition may be prepared by mixing a dispersion liquid containing a swelling inorganic layered compound uniformly dispersed in a solvent, and an aqueous polyurethane resin (dispersion liquid or aqueous solution). The polyamine compound may be added at an arbitrary stage, and may be added to a dispersion liquid of the swelling inorganic layered compound and/or a dispersion liquid containing the aqueous polyurethane resin. In order to improve gas barrier properties, it is preferred to extremely uniformly disperse the polyurethane resin and the inorganic layered compound in a dispersion liquid or coating agent. In particular, due to a possibility of secondary coagulation of the inorganic layered compound in a dispersion liquid, it is preferred to disperse or mix the inorganic layered compound in a solvent, and then disperse the inorganic layered compound through the use of a forced mechanical dispersion means with shearing force or shearing stress, for example, a homomixer, a colloid mill, a jet mill, a kneader, a sand mill, a ball mill, a triple roll, and an ultrasonic dispersion apparatus.

The aqueous polyurethane resin composition of the present invention is useful for obtaining a gas barrier laminated film since the composition is high in both adhesiveness to a base film and gas barrier properties. For example, the aqueous resin composition of the present invention (aqueous solution or water dispersion) is suitable for forming a laminated film (or laminate) in which a coating layer comprising the resin composition is layered (laminated or formed) on at least one surface of a base film.

As the base film, a film comprising a thermoplastic resin is usually employed. The thermoplastic resin may include, for example, a polyolefinic resin (e.g., a polyethylene, a polypropylene, and a propylene-ethylene copolymer), a polyester-series resin (e.g., a polyethylene terephthalate), a polyamide-series resin (e.g., a nylon 6, and a nylon 66), a vinyl-series resin (e.g., a polyvinyl alcohol, and an ethylene-vinyl alcohol copolymer), and a cellophane. These resins may be used singly or in combination. The preferred base film includes a polypropylene-series resin film, a polyethylene terephthalate-series resin film, and a polyamide-series resin film.

As the base film, there may be used a monolayer film, or a monolayer or laminated film obtained by using a plurality of resins. Moreover, as the base film, a laminated base film composed of other base (e.g., a metal such as aluminum, and a paper) and a thermoplastic resin, or a resin film onto which a metal (e.g., aluminum) or a metal oxide (e.g., silica) is deposited may be used.

The base film may be an unoriented film, or a uniaxially or biaxially oriented film. Moreover, the base film may be a film subjected to a surface treatment (e.g., corona discharge treatment), or an anchor-coated or undercoated film.

The thickness of the base film is about 3 to 200 µm, preferably about 5 to 120 µm, and more preferably about 10 to 100 µM.

The thickness of the coating layer (coating layer after drying) containing the aqueous resin composition is, for example, about 0.1 to 15 μm, preferably about 0.2 to 10 μm, more preferably about 0.5 to 5 μm, and usually about 0.7 to 5 μm (particularly about 1 to 5 μm).

The lamination method on the base film is not particularly limited to a specific one, and a conventional method may be adopted,f or example, a gravure coating method, a reverse coating method, a roll coating method, a bar coating method, a spray coating method, an air knife coating method, and a dipping method. The lamination may be also conducted by combining these methods appropriately. The laminated film (or laminate) may be formed by coating or laminating the aqueous polyurethane resin composition on the base, and then removing a solvent in a drying step to make a film (or coat).

INDUSTRIAL APPLICABILITY

According to the present invention, an aqueous resin composition having no possibility of polluting the environment and being excellent in gas barrier properties, and a laminated film (or laminate) comprising the composition layered and having gas barrier properties can be obtained. Therefore, such a composition can be utilized as various packaging materials (such as a food packaging) in a variety of fields.

EXAMPLES

The following examples are intended to describe this invention in further detail and should by no means be interpreted as defining the scope of the invention.

Production Example 1

Polyurethane Resin 1, PUD1

XDI (xylylene diisocyanate) (45.5 g), 93.9 g of hydrogenated XDI (1,3-bis(isocyanatomethyl)cyclohexane), 24.8 g of ethylene glycol, 13.4 g of dimethylolpropionic acid and 80.2 g of methyl ethyl ketone as a solvent were mixed together and reacted at 70° C. under an atmosphere of nitrogen for 5 hours. The resultant carboxyl group-containing polyurethane prepolymer solution was then neutralized at 40° C. with 9.6 g of triethylamine. This polyurethane prepolymer solution was dispersed in 624.8 g of water by a homodisper, a chain-extending reaction of the prepolymer was carried out by using 21.1 g of 2-[(2-aminoethyl)amino]ethanol, and methyl ethyl ketone was distilled off from the dispersion to give a water-dispersive polyurethane resin 1 having a solid content of 25% byw eight. The acid value of the resin was 26.9 mgKOH/g, and the total concentration of the urethane group and the urea group was 39.6% by weight.

Production Example 2

(Polyurethane Resin 2, PUD2) Hydrogenated XDI (1,3-bis(isocyanatomethyl)cyclohexane) (137.3 g), 5.7 g of bis(hydroxyethyl)terephthalic acid, 56.2 g of triethyleneglycol, 16.1 g of dimethylolbutanoic acid and 106.4 g of acetone as a solvent were mixed together and reacted at 55° C. under an atmosphere of nitrogen for 8 hours. The resultant carboxyl group-containing polyurethane prepolymer solution was then neutralized at 40° C. with 10.8 g of triethylamine. This polyurethane prepolymer solution was dispersed in 750 g of water by a homodisper, a chain-extending reaction of the prepolymer was carried out by using 23.9 g of 2-hydroxyethylaminopropylamine, and acetone was distilled off from the dispersion to give a water-dispersive polyurethane resin 2 having a solid content of 25% by weight. The acid value of the resin was 24.4 mgKOH/g, and the total concentration of the urethane group and the urea group was 33.2% by weight.

Production Example 3

Polyurethane Resin 3 (Low Acid Value Type), PUD3

XDI (55.9 g), 115.3 g of hydrogenated XDI, 34.8 g of ethylene glycol, 10.1 g of dimethylolpropionic acid and 95.8 g of methyl ethyl ketone as a solvent were mixed together and reacted at 70° C. under an atmosphere of nitrogen for 5 hours. The resultant carboxyl group-containing polyurethane prepolymer solution was then neutralized at 40° C. with 7.4 g of triethylamine. This polyurethane prepolymer solution was dispersed in 750.0 g of water by a homodisper, a chain-extending reaction of the prepolymer was carried out by using 26.5 g of 2-[(2-aminoethyl)amino]ethanol, and methyl ethyl ketone was distilled off from the dispersion to give a water-dispersive polyurethane resin 3 having a solid content of 25% by weight. The acid value of the resin was 16.8 mgKOH/g, and the total concentration of the urethane group and the urea group was 41.8% by weight.

Production Example 4

Polyurethane Resin 4(High Acid Value Type), PUD4

$H_{12}MDI$ (dicyclohexylmethane diisocyanate) (125.3 g), 46.4 g of hydrogenated XDI, 22.1 g of ethylene glycol, 20.8 g of dimethylolpropionic acid and 123.1 g of acetonitrile as a solvent were mixed together and reacted at 70° C. under an atmosphere of nitrogen for 6 hours. The resultant carboxyl group-containing polyurethane prepolymer solution was then neutralized at 40° C. with 14.1 g of triethylamine. This polyurethane prepolymer solution was dispersed in 750.0 g of water by a homodisper, a chain-extending reaction of the prepolymer was carried out by using 21.3 g of 2-[(2-aminoethyl)amino]ethanol, and acetonitrile was distilled off from the dispersion to give a water-dispersive polyurethane resin 4 having a solid content of 25% by weight. The acid value of the resin was 34.8 mgKOH/g, and the total concentration of the urethane group and the urea group was 33.6% by weight.

Production Example 5

Urethane-Modified Polyamine, UPA

Hydrogenated XDI (1,3-bis(isocyanatomethyl)cyclohexane) (97.1 g) and 93.6 g of dimethylethanolamine were dropped and mixed together and reacted at 60° C. under an atmosphere of nitrogen for 2 hours to give a urethane-modified polyamine (UPA). The amine value of this amine compound was 309 mgKOH/g.

(Swelling Inorganic Layered Compound (ii))

As the swelling inorganic layered compound (ii), a montmorillonite (manufactured by Kunimine Industries Co., Ltd., "Kunipia F"), and a synthetic mica (manufactured by Co-op Chemical CO., Ltd., "ME-100") were used.

(Polyamine Compound (iii))

As the polyamine compound (iii), the following compound was used.

2-[(2-Aminoethyl)amino]ethanol (AEEA, amine value: 1077 mgKOH/g) Metaxylylenediamine (mXDA, amine value: 824 mgKOH/g) Adduct of metaxylylenediamine with 4 mol of ethyleneoxide (mXDA-EO4, amine value: 349 mgKOH/g) γ-(2-Aminoethyl)aminopropylmethyldimethoxysilane (AEAPS, amine value: 544 mgKOH/g) Diethylenetriamine (DETA, amine value: 1631 mgKOH/g)

Examples 1 to 13

To a water dispersion of the swelling inorganic layered compound prepared at 2% by weight or 5% by weight was added a polyamine compound in a weight proportion as shown in Table 1, and the mixture was stirred for one hour. To the resulting water dispersion was added 25% by weight of PUD1 (100 g) prepared in Production Example 1 with stirring, and further added water so that the concentration of the total solid content become 10% by weight, and a coating agent was accordingly prepared.

Thereafter, the coating agent was coated on a corona discharge-treated surface of a biaxially oriented polypropylene film (thickness: 20 μm, OPP) with the use of a mayer bar so that the thickness of the coating layer after drying become 1 μm, and then the coated film was dried at 80° C. for 30 minutes.

Incidentally, in Examples 11 to 13, the same operation as the above was conducted except for using each of polyurethane resins prepared in Production Examples 2 to 4 instead of the polyurethane resin prepared in Production Example 1.

Comparative Examples 1 to 2

A laminated film was obtained in the same manner as Examples except for using a mixture only containing the polyurethane resin PUD1 and the swelling inorganic layered compound without adding a polyamine compound.

Comparative Example 3

A laminated film was obtained in the same manner as Example 7 except that the inorganic layered compound was not used.

The oxygen gas barrier properties of each of the obtained laminated films were measured by using an oxygen permeability measuring device (manufactured by Modern Control, Co., "MOCON OXTRAN10/50A") under both conditions of 20° C. and 50% RH, and 20° C. and 80% RH. The results of the oxygen permeabilities are shown in Tables 1 and 2.

Incidentally, in the Tables, "part(s)" of numeric value without parentheses indicates an amount (part(s) by weight) of a water dispersion to be added, and "part(s)" in parentheses represents an amount (part(s) by weight) of a solid content in the water dispersion. The oxygen permeability was indicated as an oxygen permeability per 1 μm of a coating layer as follows. That is, the oxygen permeability (A) of the obtained laminated film was measured, as well as the oxygen permeability (B) of the base film (biaxially oriented polypropylene film having a thickness of 20 μm) was measured. When the oxygen permeability of the coating layer alone is assumed as (C), the reciprocal of the oxygen permeability of the whole laminated film equals to the sum of the reciprocal of the oxygen permeability of each layer constituting the laminated film, and defined by the following equation.

$$1/B + 1/C = 1/A$$

The oxygen permeability (mL/(m$^2$·atm·day)) per 1 μm of the coating layer can be calculated through multiplication of the reciprocal (1/C) of the oxygen permeability calculated in accordance with the above equation and the thickness of the coating layer.

TABLE 1

| | Formulation | | | Acid group/Basic nitrogen atom | Oxygen permeability (in terms of 1 μm of coating layer) | |
|---|---|---|---|---|---|---|
| | Inorganic layered compound | Polyamine | Polyurethane resin | | 50% RH | 80% RH |
| Ex. 1 | 2% ME100 125 parts (2.5 parts) | AEEA 0.31 part | 25% PUD1 100 parts (25 parts) | 2/1 | 5.8 | 14.5 |
| Ex. 2 | 2% ME100 125 parts (2.5 parts) | AEEA 0.63 part | 25% PUD1 100 parts (25 parts) | 1/1 | 3.6 | 11.6 |
| Ex. 3 | 2% ME100 125 parts (2.5 parts) | AEEA 0.94 part | 25% PUD1 100 parts (25 parts) | 1/1.5 | 4.8 | 13.8 |
| Ex. 4 | 2% Kunipia F 125 parts (2.5 parts) | AEEA 0.31 part | 25% PUD1 100 parts (25 parts) | 1/1 | 4.2 | 13.2 |
| Ex. 5 | 2% ME100 125 parts (2.5 parts) | mXDA 0.82 part | 25% PUD1 100 parts (25 parts) | 1/1 | 2.8 | 8.4 |
| Ex. 6 | 2% ME100 125 parts (2.5 parts) | mXDA-EO4 1.93 parts | 25% PUD1 100 parts (25 parts) | 1/1 | 4.5 | 14.0 |
| Ex. 7 | 2% ME100 125 parts (2.5 parts) | AEAPS 1.24 parts | 25% PUD1 100 parts (25 parts) | 1/1 | 1.8 | 5.2 |
| Ex. 8 | 5% ME100 250 parts (12.5 parts) | AEAPS 1.24 parts | 25% PUD1 100 parts (25 parts) | 1/1 | 0.6 | 2.0 |
| Ex. 9 | 2% ME100 125 parts (2.5 parts) | DETA 0.41 part | 25% PUD1 100 parts (25 parts) | 1/1 | 2.9 | 8.3 |
| Ex. 10 | 2% ME100 125 parts (2.5 parts) | UPA 2.18 parts | 25% PUD1 100 parts (25 parts) | 1/1 | 3.4 | 11.0 |
| Ex. 11 | 5% ME100 250 parts (12.5 parts) | AEAPS 1.12 parts | 25% PUD3 100 parts (25 parts) | 1/1 | 2.0 | 13.2 |
| Ex. 12 | 2% ME100 125 parts (2.5 parts) | UPA 1.36 parts | 25% PUD1 100 parts (25 parts) | 1/1 | 2.5 | 9.8 |
| Ex. 13 | 2% ME100 125 parts (2.5 parts) | UPA 2.82 parts | 25% PUD4 100 parts (25 parts) | 1/1 | 5.2 | 15.2 |

TABLE 2

| | Formulation | | | Acid group/Basic nitrogen atom | Oxygen permeability (in terms of 1 μm of coating layer) | |
|---|---|---|---|---|---|---|
| | Inorganic layered compound | Polyamine | Polyurethane resin | | 50% RH | 80% RH |
| Com. Ex. 1 | 2% ME100 125 parts (2.5 parts) | — | 25% PUD1 100 parts (25 parts) | — | 6.2 | 24.0 |
| Com. Ex. 2 | 2% Kunipia F 125 parts (2.5 parts) | — | 25% PUD1 100 parts (25 parts) | — | 8.4 | 27.4 |
| Com. Ex. 3 | — | AEAPS 1.24 parts | 25% PUD1 100 parts (25 parts) | 1/1 | 45 | 139 |

As apparent from the Tables, compared with Comparative Examples, Examples show excellent gas barrier properties, and the gas barrier properties are excellent even under a highly humid environment.

The invention claimed is:

1. An aqueous resin composition having gas barrier properties, which comprises
   (i) a polyurethane resin having a urethane group and a urea group in a total concentration of 25 to 60% by weight and having an acid group,
   (ii) an inorganic compound, and
   (iii) a polyamine,
   wherein the polyurethane resin (i) is an aqueous polyurethane resin which comprises a residue of a polyisocyanate compound (A), a residue of a polyhydroxyalkanecarboxylic acid (B), and optionally a polyol compound (C), wherein when the polyol compound (C) is included, each of the residues (B) and (C) are bonded to the residue of the polyisocyanate compound (A) through a urethane group for forming a prepolymer having an isocyanate group and a carboxyl group, and a residue of a chain-extension agent (D) which bonds to the prepolymer through at least a urea group to form a polyurethane having the carboxyl group, and the carboxylic group of the polyurethane is neutralized with a neutralizing agent, and the chain-extension agent (D) is at least one member selected from the group consisting of a diamine, hydrazine and a hydrazine derivative; the proportion of the total amount of components (B), (C) and (D) each having an active hydrogen atom is, as the total amount of the active hydrogen atom, about 0.8 to 1.2 mol relative to 1 mol of the isocyanate group of the polyisocyanate compound (A); and the polyisocyanate compound (A) contains at least one member selected from the group consisting of a xylylene diisocyanate and a hydrogenated xylylene diisocyanate;
   the inorganic compound (ii) consists essentially of at least one swelling inorganic layered compound selected from the group consisting of a smectite group clay mineral and a mica group clay mineral;
   the polyamine (iii) comprises urethane-modified polyamine; the polyamine (iii) is a component added to a dispersion of the at least one swelling inorganic layered compound (ii), an aqueous solution or dispersion of the polyurethane resin (i), or a dispersion containing an aqueous solution or dispersion of the polyurethane resin (i) and the at least one swelling inorganic layered compound (ii); and
   the proportion of the acid group of the polyurethane resin (i) relative to the basic nitrogen atom of the polyamine (iii) is 3/1 to 1/2 as the equivalent ratio.

2. A resin composition according to claim 1, wherein the polyurethane resin (i) comprises the residue of the polyisocyanate compound (A), the residue of the polyhydroxyalkanecarboxylic acid (B), and a residue of a polyol compound (C), each of the residues (B) and (C) bonding to the residue of the polyisocyanate compound (A) through a urethane group for forming a prepolymer having an isocyanate group, and a carboxyl group, and the residue of the chain-extension agent (D) which bonds to the prepolymer through at least a urea group to form a polyurethane having the carboxyl group, and the carboxylic group of the polyurethane is neutralized with a neutralizing agent;
   the polyisocyanate compound (A) contains at least one member selected from the group consisting of a xylylene diisocyanate and a hydrogenated xylylene diisocyanate; and
   the polyol compound (C) contains a polyol component having 2 to 8 carbon atoms in a proportion of not less than 90% by weight in the polyol compound.

3. A resin composition according to claim 1, wherein the at least one swelling inorganic layered compound (ii) comprises at least one member selected from the group consisting of a water-swelling mica and a montmorillonite.

4. A resin composition according to claim 1, wherein the acid value of the polyurethane resin (i) is 16 to 50 mgKOH/g, and the amine value of the polyamine (iii) is 300 to 1500 mgKOH/g.

5. A resin composition according to claim 1, wherein the ratio of the at least one swelling inorganic layered compound (ii) relative to the polyurethane resin (i) is 1/100 to 200/100 in terms of solid content.

6. A gas barrier laminated film comprising a base film, and a layer formed on at least one surface of the base film, wherein the layer comprises the aqueous resin composition recited in claim 1.

7. A gas barrier laminated film comprising a base film, and a layer formed on at least one surface of the base film, wherein the layer comprises the aqueous resin composition recited in claim 2.

8. A gas barrier laminated film comprising a base film, and a layer formed on at least one surface of the base film, wherein the layer comprises the aqueous resin composition recited in claim 3.

9. A gas barrier laminated film comprising a base film, and a layer formed on at least one surface of the base film, wherein the layer comprises the aqueous resin composition recited in claim 4.

10. A gas barrier laminated film comprising a base film, and a layer formed on at least one surface of the base film, wherein the layer comprises the aqueous resin composition recited in claim 5.

11. An aqueous resin composition having gas barrier properties, which comprises
(i) a polyurethane resin having a urethane group and a urea group in a total concentration of 25 to 60% by weight and having an acid group,
(ii) an inorganic compound, and
(iii) a polyamine,
wherein the polyurethane resin (i) is an aqueous polyurethane resin which comprises a residue of a polyisocyanate compound (A), a residue of a polyhydroxyalkanecarboxylic acid (B), and optionally a polyol compound (C), wherein when the polyol compound (C) is included, each of the residues (B) and (C) are bonded to the residue of the polyisocyanate compound (A) through a urethane group for forming a prepolymer having an isocyanate group and a carboxyl group, and a residue of a chain-extension agent (D) which bonds to the prepolymer through at least a urea group to form a polyurethane having the carboxyl group, and the carboxylic group of the polyurethane is neutralized with a neutralizing agent, and the chain-extension agent (D) is at least one member selected from the group consisting of a diamine, hydrazine and a hydrazine derivative, the proportion of the total amount of components (B), (C) and (D) each having an active hydrogen atom is, as the total amount of the active hydrogen atom, about 0.8 to 1.2 mol relative to 1 mol of the isocyanate group of the polyisocyanate compound (A); and the polyisocyanate compound (A) contains at least one member selected from the group consisting of a xylylene diisocyanate and a hydrogenated xylylene diisocyanate;
the inorganic compound (II) consists essentially of at least one swelling inorganic layered compound selected from the group consisting of a smectite group clay mineral and a mica group clay mineral;
the polyamine (iii) comprises a urethane-modified polyamine; the polyamine (iii) is a component added to a dispersion of the at least one swelling inorganic layered compound (ii), an aqueous solution or dispersion of the polyurethane resin (i), or a dispersion containing an aqueous solution or dispersion of the polyurethane resin (i) and the at least one swelling inorganic layered compound (ii);
the proportion of the acid group of the polyurethane resin (i) relative to the basic nitrogen atom of the polyamine (iii) is 3/1 to 1/2 as an equivalent ratio, and
the acid value of the polyurethane resin (i) is 15 to 60 mgKOH/g, and the amine value of the polyamine (iii) is 200 to 1700 mgKOH/g.

12. A resin composition according to claim 11, wherein the polyurethane resin (i) comprises the residue of the polyisocyanate compound (A), the residue of the polyhydroxyalkanecarboxylic acid (B), and a residue of a polyol compound (C), each of the residues (B) and (C) bonding to the residue of the polyisocyanate compound (A) through a urethane group for forming a prepolymer having an isocyanate group and a carboxyl group, and the residue of the chain-extension agent (D) which bonds to the prepolymer through at least a urea group to form a polyurethane having the carboxyl group, and the carboxylic group of the polyurethane is neutralized with a neutralizing agent;
the polyisocyanate compound (A) contains at least one member selected from the group consisting of a xylylene diisocyanate and a hydrogenated xylylene diisocyanate in a proportion of not less than 30% by weight in the polyisocyanate compound; and
the polyol compound (C) contains a polyol component having 2 to 8 carbon atoms in a proportion of not less than 90% by weight in the polyol compound.

13. A resin composition according to claim 11, wherein the at least one swelling inorganic layered compound (ii) comprises at least one member selected from the group consisting of a water-swelling mica and a montmorillonite.

14. A resin composition according to claim 11, wherein the ratio of the at least one swelling inorganic layered compound (ii) relative to the polyurethane resin (i) is 1/100 to 200/100 in terms of solid content.

15. A gas barrier laminated film comprising a base film, and a layer formed on at least one surface of the base film, wherein the layer comprises the aqueous resin composition recited in claim 11.

16. A resin composition according to claim 1, wherein said polyamine is interposed between layers of the at least one inorganic layered compound (ii).

* * * * *

UNITED STATES PATENT AND TRADEMARK OFFICE
CERTIFICATE OF CORRECTION

PATENT NO.         : 9,006,338 B2
APPLICATION NO.    : 10/575783
DATED              : April 14, 2015
INVENTOR(S)        : Takashi Uchida et al.

It is certified that error appears in the above-identified patent and that said Letters Patent is hereby corrected as shown below:

In the Claims

Line 60 of col. 15, "the polyamine (iii) comprises urethane-modified" should read --the polyamine (iii) comprises a urethane-modified--.

Signed and Sealed this
Eighth Day of September, 2015

Michelle K. Lee
*Director of the United States Patent and Trademark Office*